United States Patent
Bohnert et al.

(10) Patent No.: US 7,251,023 B2
(45) Date of Patent: Jul. 31, 2007

(54) HIGH-RESOLUTION FIBER LASER SENSOR

(75) Inventors: Klaus Bohnert, Oberrohrdorf (CH); Karim Haroud, Chavannes-sur-Moudon VD (CH); Andreas Frank, Zurich (CH); Hubert Brändle, Oberengstringen (CH)

(73) Assignee: Vetco Gray Controls Ltd., Nailsea (GB)

( * ) Notice: Subject to any disclaimer, the term of this patent is extended or adjusted under 35 U.S.C. 154(b) by 0 days.

(21) Appl. No.: 10/512,574

(22) PCT Filed: Apr. 29, 2003

(86) PCT No.: PCT/CH03/00277

§ 371 (c)(1),
(2), (4) Date: Jul. 24, 2005

(87) PCT Pub. No.: WO03/093770

PCT Pub. Date: Nov. 13, 2003

(65) Prior Publication Data

US 2006/0013534 A1 Jan. 19, 2006

(30) Foreign Application Priority Data

Apr. 30, 2002 (EP) .................................. 02405353

(51) Int. Cl.
*G01N 21/00* (2006.01)

(52) U.S. Cl. .................................................. 356/73.1

(58) Field of Classification Search ...................... None
See application file for complete search history.

(56) References Cited

U.S. PATENT DOCUMENTS 5,448,657 A    9/1995    Kim et al.

(Continued)

FOREIGN PATENT DOCUMENTS

EP        1 060 372        9/1999

(Continued)

OTHER PUBLICATIONS

1. Kim et al., Polarization control of polarimetric fiber-laser sensors, Optic Letters, Sep. 1, 1993, vol. 18, No. 17, pp. 1465-1467.

(Continued)

*Primary Examiner*—Tu T. Nguyen
(74) *Attorney, Agent, or Firm*—Buchanan Ingersoll & Rooney PC

(57) ABSTRACT

A high-resolution fiber laser sensor for measuring a quantity to be measured M has a pumping light source, a fiber laser and a detection/evaluating unit. The fiber laser has: a birefringent first end reflector, a second end reflector, a laser-amplifying fiber, a sensor fiber and a mode coupling. The laser-amplifying fiber, the sensor fiber and the mode coupling are arranged between the end reflectors. In the fiber laser, light is capable of propagating in two optical states which are orthogonal to one another due to their polarization and/or their transversal space structure. The orthogonal optical states can be coupled to one another by the mode coupling. In the fiber laser, a number of longitudinal modes are capable of oscillating in each of the two optical states. In the sensor fiber a change in the birefringence for the two orthogonal optical states can be achieved by interaction of the quantity to be measured with the sensor fiber.

10 Claims, 4 Drawing Sheets

U.S. PATENT DOCUMENTS

| | | |
|---|---|---|
| 5,513,913 A | 5/1996 | Ball et al. |
| 5,564,832 A | 10/1996 | Ball et al. |
| 6,532,321 B1 * | 3/2003 | Zhang et al. ............. 385/27 |
| 6,640,027 B2 * | 10/2003 | Kim et al. .............. 385/28 |
| 6,801,686 B2 * | 10/2004 | Sorin .................... 385/28 |

FOREIGN PATENT DOCUMENTS

| | | |
|---|---|---|
| GB | 2 299 203 A | 9/1996 |
| GB | 2 323 441 A | 9/1998 |
| WO | WO 00/77562 A1 | 12/2000 |

OTHER PUBLICATIONS

2. Ball et al., "Polarimetric heterodyning Bragg-grating fiber-laser sensor", Optics Letters, Nov. 15, 1993, vol. 18, No. 22, pp. 1976-1978.

* cited by examiner

Fig. 3a
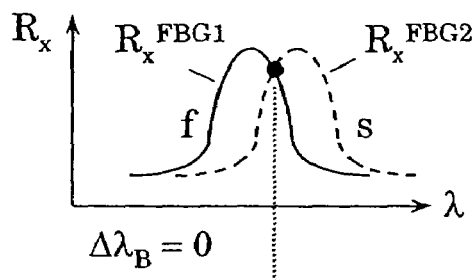
Fig. 3b
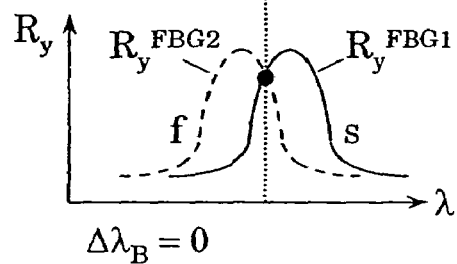
Fig. 3c
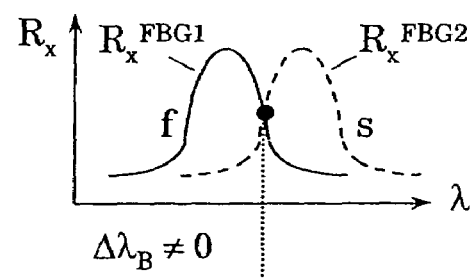
Fig. 3d
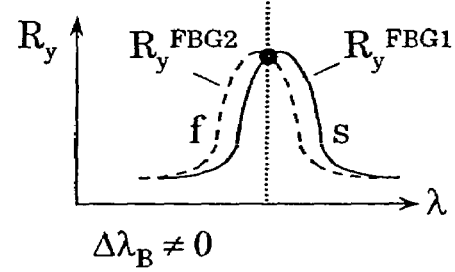
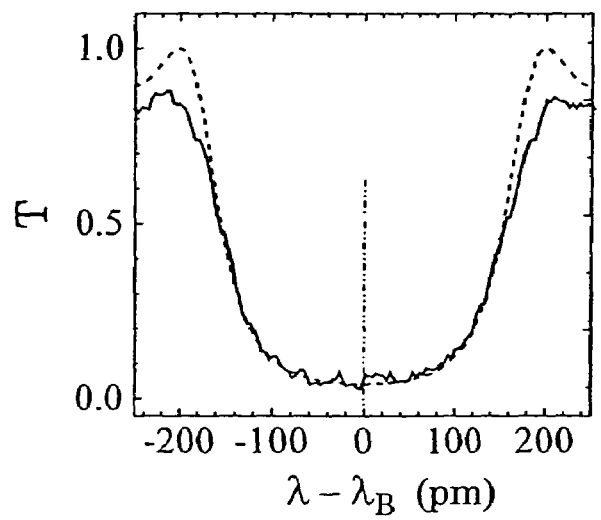
Fig. 4a
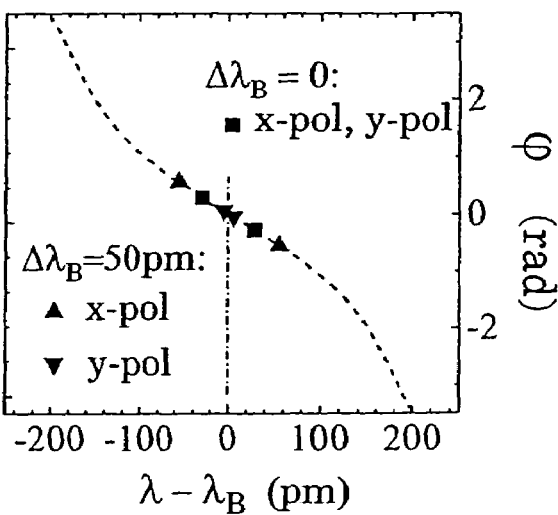
Fig. 4b

HIGH-RESOLUTION FIBER LASER SENSOR

TECHNICAL FIELD

The invention relates to the field of fiber-optical sensor technology.

PRIOR ART

Such a fiber-optical sensor forming the preamble of claim 1 is known, for example, from Laid-Open Specification EP 106 03 72. In this document, a sensor is disclosed which, in particular, is suitable for measuring pressures and comprises a pumping light source, a Fabry-Perot fiber laser, a detection unit, an evaluating unit and a number of feed fibers. Among other things, the feed fibers connect the pumping light source to the fiber laser and the fiber laser to the detection unit. The fiber laser consists of two end reflectors constructed as fiber Bragg gratings (FBG), and a laser fiber. The laser fiber comprises a laser-amplifying fiber and a sensor fiber. The pumping light source optically excites the $Er^{3+}$-doped laser-amplifying fiber and generates a population inversion. The fiber laser oscillates in two directions of polarization which are orthogonal to one another. For each direction of polarization, the light field of the laser consists of one or more longitudinal modes. If the sensor fiber is exposed to the pressure to be measured, a proportional change in the birefringence for the two mutually orthogonal optical states is achieved. To this end, the sensor fiber has a nonrotationally symmetric structure, for example an elliptic core. The mutually orthogonal directions of polarization x, y of the laser are aligned in parallel with the major axes of the birefringence.

If light is coupled out of the laser and brought into interference in an analyzer of the detection unit, a frequency spectrum is obtained which, apart from the optical frequencies which are in the band around $10^{14}$ Hz and, therefore, cannot be measured directly, also contains lower-frequency measurable beat signals. These comprise, on the one hand, longitudinal mode beat signals (LMB signals) which are produced by the interference between different longitudinal modes of the same optical state (polarization). Those signals with the lowest frequency are typically in the 50-MHz to 5-GHz band. On the other hand, there are also the polarization mode beat signals (PMB signals) which result from the interference between the longitudinal modes of different optical states (polarizations). The frequency of the PMB signals changes proportionally to the birefringence induced by a pressure change in good approximation. This provides a frequency-coded pressure-proportional measurement signal.

In a special embodiment of the pressure sensor from the EP 106 03 72 mentioned, the laser fiber consists of two similar birefringent fiber segments which are rotated by 90° with respect to one another. Only one of the two segments, namely the one used as sensor fiber, is exposed to the pressure to be measured. Temperature influences acting on both fiber segments are cancelled out due to the 90° splice. The pressure can then be measured without being influenced by temperature fluctuations. Without the 90° splice, these temperature fluctuations lead to measurement inaccuracies.

Due to the dispersion characteristics of the fiber materials and other effects, for example "frequency pulling", the frequency separation between two adjacent longitudinal modes of the same optical state in the fiber laser is not quite constant but slightly frequency-dependent. Thus, when a number of longitudinal modes are oscillating in the fiber laser and these effects are slightly different for the two directions of polarization, this will lead to a slight frequency widening of the measurement signal. This is typically in the range of less than 10 Hz per frequency separation between adjacent longitudinal modes. In the EP 106 03 72 mentioned, it is proposed, for improving the resolution of the sensor, to minimize the influence of the dispersion in the fiber laser by reducing the number of longitudinal modes oscillating in the fiber laser to a few modes. This can be achieved by choosing a short cavity length and by using narrowband FBGs with, for example, a 200 pm bandwidth as end reflectors.

Sensors of similar design, particularly strain sensors, are disclosed in patent specifications U.S. Pat. No. 5,513,913 and U.S. Pat. No. 5,564,832 and in the article by G. A. Ball et al., "Polarimetric heterodyning Bragg-grating fiber-laser sensor", Optics Letters 18 (22), p. 1976-1978. In the last-mentioned document, a reduction in the line width of the PMB signals is achieved by reducing the number of oscillating longitudinal modes by choosing a short cavity length of 2.5 cm and using narrow-band reflecting FBGs. Thus, line widths of PMB signals of less than 2.5 kHz were achieved.

In the article "Polarization control of polarimetric fiber-laser sensors", Opt. Lett. 18, 1465 (1993) by H. K. Kim, S. K. Kim and B. Y. Kim, a fiber laser sensor is presented which has standard mirrors as end reflectors. Because the fiber laser also had a large laser cavity length of 340 cm, a large number of longitudinal modes were active. Under these circumstances, the birefringence of the laser fiber led to problems in the interpretation of the signal spectra since LMB signals and PMB signals overlapped greatly in the spectrum. It was possible to minimize these problems by a 90° splice in the laser fiber center. For such a sensor, line widths of 1.2 MHz were achieved for PMB signals, corresponding to $4 \times 10^{-2}$ of the free spectral range (FSR) of the laser resonator.

In U.S. Pat. No. 5,448,657, a similar fiber laser sensor is described which operates with PMB signal detection.

In all aforementioned Fabry-Perot fiber laser sensors oscillating in several longitudinal modes per optical state (polarization), the resolution is limited by a widening of the PMB signals. This broadening is the result of the PMB signals belonging to various longitudinal mode pairs and forming a normally measured PMB peak of a given order not being perfectly degenerated. In particular, strong line broadening is obtained in the case of birefringent laser fibers.

DESCRIPTION OF THE INVENTION

It is, therefore, the object of the invention to create a fiber laser sensor of the type initially mentioned and a corresponding measuring method which do not have the above-mentioned disadvantages. In particular, it is intended to achieve a high measuring accuracy, cost-effective production and versatile applicability.

In the sensor according to the invention, the two end reflectors are detuned with respect to one another. Because the fiber laser sensor comprises the means for mode coupling and at least the first end reflector is birefringent, the extensive degeneracy of the PMB signals for every order can be cancelled. The frequency separation between adjacent longitudinal modes in a first one of the two orthogonal optical states is greater than the frequency separation between adjacent longitudinal modes in the second one of the two orthogonal optical states. The degeneracy of the PMB signals of a given order can be cancelled to such an extent that these PMB signals do not (or scarcely) overlap and are thus individually detectable. A first end reflector of the fiber laser is detuned with respect to the second end reflector so that, as a result, a degeneracy of detected beat signals is cancelled. Thus, a signal can be detected and evaluated which is produced by the interference between exactly two longitudinal modes; these two longitudinal modes have either two different mutually orthogonal states of linear polarization or have two mutually orthogonal transversal space structures. The line width of the detected signal is distinctly reduced due to the mutual detuning of the end reflectors. Thus, an improved resolution is achieved.

Measurement signals can be evaluated in low frequency bands and by using correspondingly cost-effective evaluating electronics, achieving a high resolution, nevertheless. It is also possible to achieve the same resolution as by means of more elaborate evaluating electronics in a sensor known from the prior art in a sensor according to the invention by using simpler and correspondingly more cost-effective evaluating electronics. The fact that a laser with a long laser cavity can be used in a sensor according to the invention provides for a high resolution, on the one hand. On the other hand, it also allows for a great length of interaction of the sensor with the quantity to be measured and provides for versatile applicability of the sensor.

The phase shifts experienced by the light when it is reflected at the end reflectors are an important aspect. The sum of the first derivatives (with respect to the frequency) of the phase shift $\phi$ on reflection at the first and the second end reflector is greater for the light which is in a first one of the two orthogonal optical states than for the light which is in the second one of the two optical states. If the end reflectors are constructed in such a manner that this condition is met, the cancellation of the degeneracy and the improvement in resolution according to the invention is achieved. One possibility of constructing the end reflectors in this manner is to detune the end reflectors with respect to one another. The dispersion of the phase shift $\phi$ on reflection means the derivative of the phase shift $\phi$ with respect to frequency $\nu$ (at the frequency at which the corresponding optical state is oscillating in the laser).

In a preferred embodiment of the subject matter of the invention, the two orthogonal optical states capable of propagation in the laser are two linear polarization modes. A 90° fiber splice is then preferably used as the means for mode coupling. The two polarization modes preferably have the same transversal space structure.

In a further preferred embodiment of the subject matter of the invention, the two orthogonal optical states capable of oscillating in the laser are two transversal space modes, particularly $LP_{01}$ and $LP_{11}^{even}$. A fiber splice laterally offset is then preferably used as the means for mode coupling. These two orthogonal space modes preferably have the same linear polarization.

In a further preferred embodiment of the subject matter of the invention, exactly two orthogonal optical states are capable of propagation in the fiber laser. As a result, the sensor can be operated with low pumping power and/or with an only slightly doped laser fiber. This also simplifies the signal evaluation.

In a further preferred embodiment, the fiber laser is symmetrically constructed: the entire laser fiber is a fiber with an elliptical core cross section and acts as a laser-amplifying fiber. Apart from the mutual detuning, the two end reflectors are constructed as similar birefringent fiber Bragg gratings which are inscribed into the laser-amplifying fiber. The means for mode coupling is arranged in the center of the optical path length between the two end reflectors and the section of the laser-amplifying fiber arranged between one of the end reflectors and the means for mode coupling is used as sensor fiber. Such a symmetrically constructed sensor has the advantage of being stabilized against temperature fluctuations and other interfering influences acting symmetrically on the segments of the laser fiber arranged on both sides of the means for mode coupling.

In a further embodiment, the sensor has a detuning means with the aid of which the mutual detuning of the end reflectors can be adjusted. As a result, it is possible to adapt the magnitude of the detuning of the measurement, on the one hand, and, on the other hand, to keep the detuning constant. The detuning of the end reflectors is preferably created during their production.

Further preferred embodiments can be obtained from the dependent claims and figures.

BRIEF DESCRIPTION OF THE DRAWINGS

In the text which follows, the subject matter of the invention is explained in greater detail with reference to the attached drawings, in which:

FIGS. 3a-d show a diagrammatic representation of the reflection peaks of the end reflectors of a sensor with linearly polarized optical states for 3a: undetuned end reflectors and x polarization, 3b: undetuned end reflectors and y polarization, 3c: detuned end reflectors and x polarization, 3d: detuned end reflectors and y polarization;

FIG. 4a shows a transmission spectrum of a fiber Bragg grating measured (continuous line) and calculated (dashed line);

FIG. 4b shows the phase shift $\phi$ on reflection at the fiber Bragg grating from FIG. 4a in dependence on the wavelength $\lambda$, calculated (dashed line) and exemplary values (triangles, squares);

The reference symbols used in the drawings and their meaning are listed in summary in the list of reference designations. In principle, identical parts are provided with identical reference symbols in the figures.

APPROACHES FOR CARRYING OUT THE INVENTION

Figure 1:
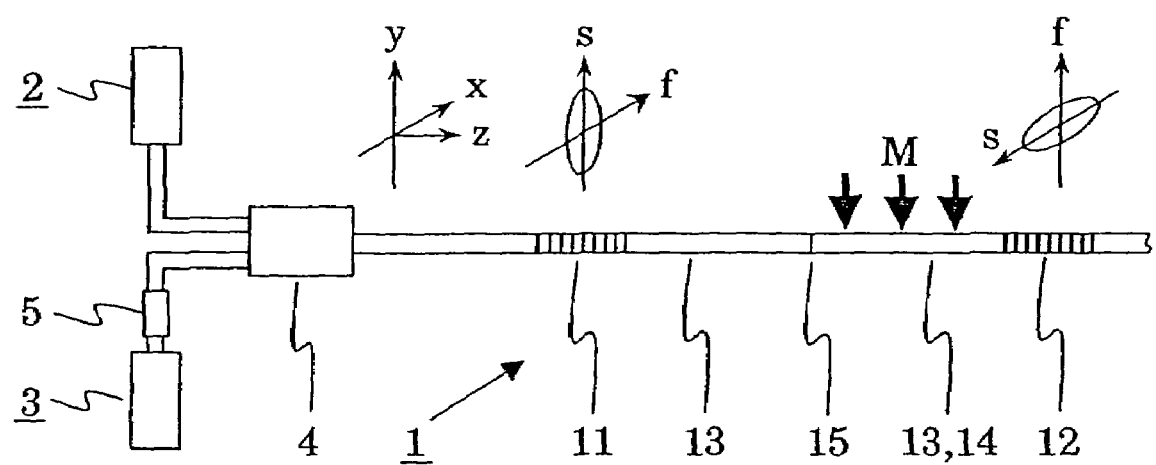
FIG. 1 shows a diagrammatic representation of a sensor according to the invention.

FIG. 1 diagrammatically shows a sensor according to the invention for measuring a quantity to be measured M. Apart from a fiber laser 1, the sensor comprises a pumping laser as pumping light source 2 for the fiber laser 1 and a detection/evaluating unit 3. A fiber coupler 4 connects the fiber laser 1 to these two components 2, 3 via connecting fibers. Between the fiber coupler 4 and the detection/evaluating unit 3, an optical isolator is advantageously also interposed. In the text which follows, only details of the fiber laser 1 are essentially discussed. Details about the other components of the sensor and about the interaction between the various components of the sensor can be found in the relevant prior art and, in particular, the EP 106 03 72 initially quoted. For this reason, the latter and its entire disclosed content are accepted into the description.

The fiber laser 1 is produced from an $Er^{3+}$-doped optical fiber with elliptical core cross section. Into this laser fiber, a first fiber Bragg grating (FBG) and a second FBG are holographically inscribed. The first FBG represents a first end reflector 11 of the fiber laser 1 and the second FBG represents a second end reflector 12. Because of their elliptical core cross section, the two FBGs 11, 12 are birefringent with respect to linear polarization and similarly constructed apart from a mutual detuning. In the center between the two FBGs 11, 12, the laser fiber is cut apart and spliced together again rotated by 90°. As a result, there is a 90° splice 15 in the center between the two FBGs 11, 12. This splice is used as means for mode coupling 15. The axes of the FBGs 11, 12 are thus also rotated by 90° with respect to one another. The entire laser fiber arranged between the FBGs 11, 12 is used as laser-amplifying fiber 13. The fiber segment 14 between the 90° splice 15 and the second FBG 12 can be exposed wholly or partially to the quantity to be measured M and is thus used as sensor fiber 14.

The space axes x,y,z are sketched in FIG. 1 where z is aligned along the fiber axis. For the first FBG 11 the slow (long) axis s is parallel to y. And the fast (short) axis f is along x. For the second FBG 12, the conditions are reversed because of the 90° splice 15: the slow (long) axis s is aligned along x whereas the fast (short) axis f extends along y. These conditions are outlined in FIG. 1.

Figure 2A:
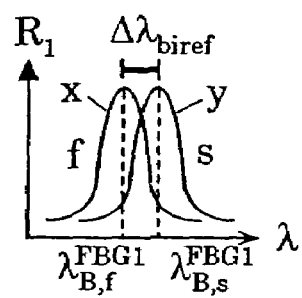
FIGS. 2a, 2b show a diagrammatic representation of the reflection peaks of the end reflectors of a sensor according to the invention with linearly polarized optical states.
Figure 2B:
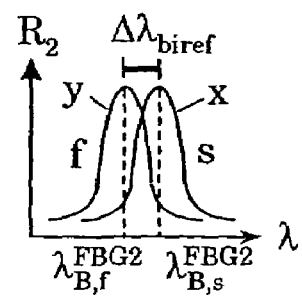

In FIGS. 2a and 2b, the reflectivities $R_1$, $R_2$—of the end reflectors 11, 12 are represented diagrammatically. FIG. 2a shows the reflectivity $R_1$ of the first FBG 11. Due to the birefringence of FBG 11, there is a reflection peak at a shorter wavelength $\lambda_{B,f}^{FBG1}$ for light polarized along the fast axis f than for light polarized along the slow axis s. The wavelength separation $\Delta\lambda_{biref}$ between the two reflection peak wavelengths (Bragg wavelengths) is $$\Delta\lambda_{biref}=\lambda_{B,F}^{FBG1}-\lambda_{B,s}^{FBG1}.$$

The conditions for the second FBG 12 are shown in FIG. 2b. As already discussed in FIG. 1, the correlation between the fiber axes s, f and the space axes x, y for the second FBG 12 is exactly reverse from the first FBG 11. Since, in the present exemplary embodiment, the two FBGs 11, 12 are constructed identically apart from a mutual detuning, the reflection peaks are not located at the same wavelengths ($\lambda_{B,f}^{FBG1} \neq \lambda_{B,f}^{FBG2}$ and $\lambda_{B,s}^{FBG1} \neq \lambda_{B,s}^{FBG2}$), but the reflection peaks for the second FBG 12, and thus the Bragg wavelengths, are separated by the same $$66\ \lambda_{biref}=\lambda_{B,f}^{FBG2}-\lambda_{B,s}^{FBG2}.$$

The mutual detuning of FBGs 11, 12 is explained with reference to FIGS. 3a-d. FIGS. 3a and 3b firstly show the case known from the prior art where the two FBGs 11, 12 have the same Bragg wavelengths. The difference in the Bragg wavelength $\Delta\lambda_B$ is thus $$\Delta\lambda_B=\lambda_{B,f}^{FBF2}-\lambda_{B,f}^{FBG1}=\lambda_{B,s}^{FBG2}-\lambda_{B,s}^{FBG1}=0.$$

FIG. 3a shows the reflectivity of FBGs 11, 12 for light linearly polarized along the x axis. FIG. 3b shows the reflectivity of FBGs 11, 12 for light linearly polarized along the y axis. At the wavelength identified by the thick points and the dotted line, the product of the reflectivity of the two FBGs 11, 12 is maximum and thus the resonator losses are minimum so that the laser oscillates at this wavelength. Due to the similarity of FBGs 11, 12 and the similarity of the reflection peaks for the two polarizations x, y, the fiber laser 1 oscillates at the same wavelength for x and for y polarization.

FIGS. 3c and 3d show the case according to the invention where the Bragg wavelength of the first FBG 11 differs from the Bragg wavelength of the second FBG 12, i.e.

$$\Delta\lambda_B=abs(\lambda_{B,f}^{FBG2}-\lambda_{B,f}^{FBG1})=abs(\lambda_{B,s}^{FBG2}-\lambda_{B,s}^{FBG1})\neq0.$$

The reflection peaks of the two FBGs 11, 12 for x-polarized light are separated further than the reflection peaks of the two FBGs 11, 12 for y-polarized light in this case. However, the wavelengths at which the fiber laser 1 is oscillating are still identical for x and for y polarization (dashed line, bold dots).

FIGS. 4a and 4b illustrate why this can lead to different dispersions and different phase shifts $\phi$ on reflection at the FBGs for x- and y-polarized light. FIG. 4a shows the normalized transmission curve T for an FBG; T=1−R. The experimentally measured spectrum is shown by the continuous line; the calculated spectrum is shown dashed. The wavelength axis (bottom) is zeroed at the Bragg wavelength $\lambda_B$, or more precisely: at the central wavelength of the significant reflection peak in each case.

FIG. 4b shows the dependence of the (relative) phase shift $\phi$ on wavelengths on reflection at the FBG of FIG. 4a. The phase shift $\phi$ is given relative to the phase shift at the Bragg wavelength $\lambda_B$. The dashed S-shaped line is a calculated curve. The values of $\phi$ occurring for $\Delta\lambda_B=0$ and for $\Delta\lambda_B=50$ pm in the fiber laser 1 are identified by squares and triangles, respectively, as examples.

For FBGs 11, 12 which are not detuned ($\Delta\lambda_B=0$), the wavelengths at which the fiber laser 1 is oscillating are equally far apart from the zero point of the relative wavelength $\lambda-\lambda_B$ for x and y polarization (small squares). As an example, $\Delta\lambda_{biref}=60$ pm was selected. This can also be seen in the diagrammatic representation of FIGS. 3a and 3b. The case according to the invention where the FBGs 11, 12 are mutually detuned is represented by the small triangles. $\Delta\lambda_B=50$ pm had been selected. The wavelengths at which the fiber laser 1 is oscillating are separated by different amounts from the zero point of the relative wavelength $\lambda-\lambda_B$ for x- and y-polarized light (small triangles). This can also be seen in the diagrammatic representation of FIGS. 3c and 3d. The wavelengths at which the fiber laser 1 is oscillating are always $$\lambda-\Delta\lambda_B=\pm(\Delta\lambda_{biref}\pm\Delta\lambda_B)/2.$$

Due to the different slopes of the curve $\phi(\lambda-\lambda_B)$ for x and for y polarization, frequency separations $v_x^{LMB}$, $v_y^{LMB}$ of different magnitude between adjacent longitudinal modes are obtained, as will be shown below, for x and y polarization in a device according to the invention (see also FIG. 5a). The conditions of resonance in the fiber laser 1 can be written as follows for x polarization:

$$2\pi p = \phi_f^{FBG1}(v_p^x) + 4\pi v_p^x n_f L_1/c + 4\pi v_p^x n_s L_2/c + \phi_s^{FBG2}(v_p^x)$$

and analogously for y polarization:

$$2\pi q = \phi_s^{FBG1}(v_q^y) + 4\pi v_q^y n_s L_1/c + 4\pi v_q^y n_f L_2/c + \phi_f^{FBG2}(v_q^y)$$

where:
p is an integer; order of the longitudinal modes in x polarization
q is an integer; order of the longitudinal modes in y polarization
$\phi_{s,f}$ is a phase shift on reflection at the FBG for light in s, f polarization
$v_p^x$ is a frequency of an x-polarized longitudinal mode of order p
$v_q^y$ is a frequency of a y-polarized longituindal mode of order q
$n_{s,f}$ is an effective index of refraction of the laser fiber for s, f polarization
$L_{1,2}$ is a geometric length of the laser fiber segment between the 90° splice and the first, second FBG
c is a velocity of light in a vacuum Dispersion effects (for the index of refraction) in the laser fiber are negligibly small and are, therefore, not quoted in the above equations for the conditions of resonance.

Firstly the case known from the prior art. If the two FBGs 11, 12 have the same Bragg wavelength, i.e. $\Delta\lambda_B=0$, and if, in addition, the two laser fiber segments are of equal length, i.e. $L_1=L_2$, the frequency separation $v_x^{LMB}$ between adjacent longitudinal modes $LM_p^x$, $LM_{p+1}^x$ for x polarization is equal to the frequency separation $v_y^{LMB}$ between adjacent longitudinal modes $LM_q^Y$, $LM_{q+1}^Y$ for y polarization:

$$v_x^{LMB} = v_{p+1}^x - v_p^x = v_{q+1}^y - v_q^y = v_y^{LMB}$$

The signals of the longitudinal mode beats (LMB) are thus identical for both polarizations x, y. The signals of the polarization mode beats (PMB) are at frequencies $v^{PMB}=abs(v_p^x - v_q^y)$ and are degenerated for each order p-q in this case.

Figure 5A:
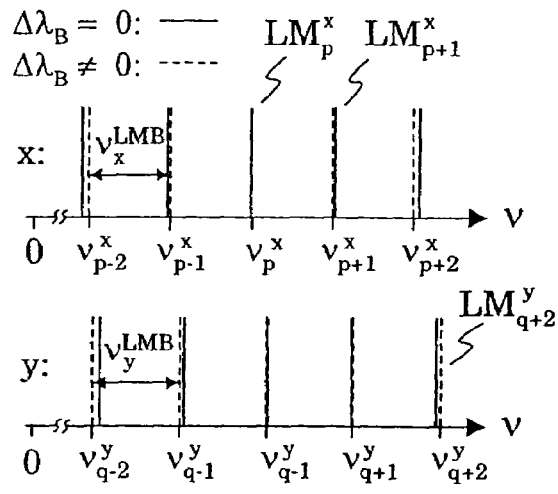
FIG. 5a shows a frequency spectrum of the longitudinal modes in x and for y polarization for detuned and for undetuned end reflectors, diagrammatically.

In FIG. 5a, the continuous lines diagrammatically illustrate these frequency relationships. In practice, of course, the degeneracy of the individual PMB signals of a given order is never perfect because there are always unavoidable asymmetries, for example of the FBGs, and other effects such as "frequency pulling". This leads to an unwanted broadening of the detected PMB signals and to a correspondingly poor sensor resolution. In particular, the difference $v_x^{LMB} - v_y^{LMB}$ of the LMB frequencies for x and y polarization can reach the range of some kilohertz if the two laser fiber segments are not of equal length, i.e. $L_1 \neq L_2$. However, this also leads to an inaccurate measurement.

FIG. 5a also shows the case according to the invention where the FBGs 11, 12 are detuned with respect to one another: $\Delta\lambda_B \neq 0$ (dashed lines). FIGS. 3c and 3d show that the laser oscillates for x and y polarization at frequencies which are at different locations on the curve $\phi(\lambda - \lambda_B)$. As will be explained further below, the slopes of the curve $\phi(\lambda - \lambda_B)$ are therefore of different magnitude for x and y polarization so that distinctly different frequencies $v_x^{LMB}$, $v_y^{LMB}$ between adjacent longitudinal modes $LM_p^x$, $LM_{p+1}^x$; $LM_q^Y$, $LM_{q+1}^Y$ are obtained for the two polarizations x, y. This results in a clear cancellation of the degeneracy of the PMB signals for every order p-q.

Figure 5B:
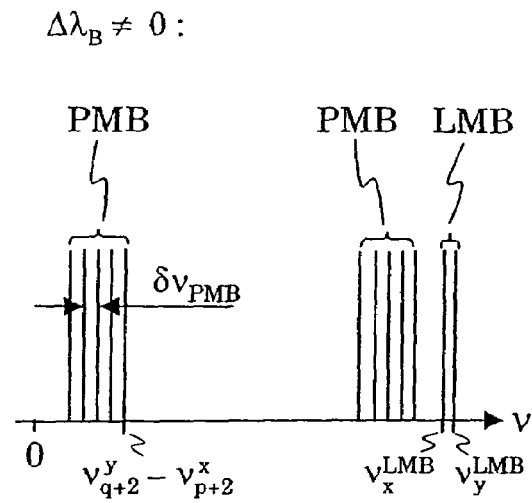
FIG. 5b shows a frequency spectrum of the beat signals of a sensor according to the invention with detuned end reflectors based on the spectrum of FIG. 5a, diagrammatically.

FIG. 5b diagrammatically shows a frequency spectrum up to the first-order LMB signal as obtained for the case according to the invention $\Delta\lambda_B \neq 0$ from FIG. 5a. The first-order LMB signal is composed of two peaks: a first peak at $v_x^{LMB}$ which is obtained from the interference between adjacent x-polarized longitudinal modes $LM_{p+1}^x$ and $LM_p^x$ for different orders p; and a second peak at $v_y^{LMB}$ which is obtained from the interference between adjacent y-polarized longitudinal modes $LM_{q+1}^y$ and $LM_q^y$ for different orders q. The degeneracy of the PMB signals of a given order is cancelled so that it is made possible to detect these PMB peaks separately (individually). Such an individual PMB signal is obtained by the interference of exactly one x-polarized longitudinal mode $LM_p^x$ with exactly one y-polarized longitudinal mode $LM_q^y$. The individual PMB signals belonging to a given order p-q are uniformly spaced apart in frequency to a first approximation with a frequency separation of $\delta v_{PMB}$, where $\delta v_{PMB}$ is given as $\delta v_{PMB} = abs(v_x^{LMB} - v_y^{LMB})$. $\delta v_{PMB}$ is typically a few 10 kHz up to several 100 kHz.

In the case of $L_1 = L_2$, $\delta v_{PMB}$ is given in a good approximation as $$\delta v_{PMB} = abs\left(\frac{\frac{\partial \varphi}{\partial v}\Big|_{\frac{1}{2}(\Delta v_{biref} + \Delta v_B)} - \frac{\partial \varphi}{\partial v}\Big|_{\frac{1}{2}(\Delta v_{biref} - \Delta v_B)}}{\pi(2nL/c)^2}\right)$$

where $\Delta v_{biref} = (c/\lambda^2) \cdot \Delta\lambda_{biref}$ is the frequency corresponding to $\Delta\lambda_{biref}$ and $\Delta v_B = (c/\lambda^2) \cdot \Delta\lambda_B$ is the frequency corresponding to $\Delta\lambda_B$. n is the average effective index of refraction of the laser fiber $n = (n_s + n_f)/2$, and $L = L_1 + L_2$ is the entire length of the laser fiber. According to the equation, $\delta v_{PMB}$ is proportional to the difference of the first derivative of the phase shift $\phi$ with respect to the frequency at frequencies which are different from the frequency $v_B$ corresponding to the Bragg wavelength $\lambda_B$ by $\frac{1}{2}(\Delta v_{biref} + \Delta v_B)$ and by $\frac{1}{2}(\Delta v_{biref} - \Delta v_B)$, respectively. Compare also the position of the peaks in FIG. 4b, identified by the triangles. The first derivative of the phase shift $\phi(v)$ with respect to the frequency $v$ is here called the dispersion $\partial\phi/\partial v$ of the phase shift $\phi$.

In the derivation of the equation, it was assumed that the frequency dependence of the phase shift $\phi(v)$ is point-symmetric with respect to $(v = v_B; \phi = 0)$ and that $\phi(v)$ can be approximated with good linearity in a small frequency range close to the frequencies at which the fiber laser 1 is oscillating. Since the frequency dependence of the phase shift $\phi$ is generally nonlinear, the two terms of derivatives occurring in the equation are never exactly equal so that a non-vanishing frequency separation $\delta v_{PMB}$ can always be achieved for $\Delta\lambda_B \neq 0$.

In the case where the optical path lengths between the means for mode coupling 15 and the first end reflector 11 and between the means for mode coupling 15 and the second end reflector 12, respectively, are different, a further contribution is added to the separation between the individual PMB signals of a given order. However, this contribution is typically less than about 10 kHz and will, therefore, not be considered further here.

Taking into consideration also the second derivative of the phase shift $\phi$, it is found that the longitudinal mode separations $v_x^{LMB}$, $v_y^{LMB}$ are not exactly equal for each of the optical states x, y but change slightly with the ordinal number p and q, respectively. Each line of the beat signals PMB, LMB shown in FIG. 5b therefore has fine splitting (not shown) and the frequency separations $\delta v_{PMB}$ between adjacent PMB signals of a given order are not all exactly equal. Since this fine splitting is small, this situation will be neglected here.

In the case where the two end reflectors 11, 12 have different dispersions $\partial \phi_1/\partial v$, $\partial \phi_2/\partial v$, it is found for $\delta v_{PMB}$ in good approximation that $\delta v_{PMB}$ is proportional to the difference between two terms, analogously to the above equation. Each of these terms is for one of the two orthogonal polarizations x, y the sum of the dispersion $\partial \phi_1/\partial v$ for reflection at the first end reflector 11 and of the dispersion $\partial \phi_2/\partial v$ for reflection at the second end reflector 12, in each case at the relevant frequencies at which the fiber laser 1 is oscillating. If thus the end reflectors 11, 12 are constructed in such a manner that the dispersion $\partial \phi_1/\partial v$ of the phase shift $\phi$ at reflection at the first end reflector 11 plus the dispersion $\partial \phi_2/\partial v$ of the phase shift $\phi$ at reflection at the second end reflector 12 is greater for one of the two optical states x, y than for the other one, then $\delta v_{PMB} \neq 0$.

The invention can be performed not only with optical states which are orthogonal to one another due to their polarization. It is also possible to work with optical states which are orthogonal to one another due to their transversal space structure. The term "orthogonal" must thus be regarded not as rectangular in the sense of 90° but is used in the mathematical sense: for mutually orthogonal basic functions or optical states from which an arbitrary optical state of the corresponding type, for example an optical state with an arbitrary transversal space structure, can be represented by linear combination. The $LP_{mn}$ modes can be used, therefore. Although they are only a (good) approximation for describing the transversal space structure, they are also orthogonal to one another in a good approximation. For example, the transversal space modes $LP_{01}$ and $LP_{11}^{even}$ can be used instead of the modes linearly polarized along s or f always discussed above. Instead of a splice 15 rotated by 90°, a fiber splice 15 which is laterally offset is then preferably used as a means for mode coupling 15. The means for mode coupling 15 changes light in the $LP_{01}$ state into light in the $LP_{11}^{even}$ state. The laterally-offset splice 15 and also the 90° splice 15 are advantageously constructed in such a manner that the coupling of the two orthogonal optical states is as complete as possible, greater than 60% or better greater than 80%.

Since, from the literature, for the transversal space modes, no designation analogous to the space axes x, y is known which could be applied on both sides of the means for mode coupling 15, reference symbols $LP'_{01}$ and $LP'_{11}^{even}$ are introduced for this purpose: $LP'_{01}$ identifies the state of the light field which oscillates in space mode $LP_{01}$ between the first end reflector 11 and the means for mode coupling 15 and in the space mode $LP_{11}^{even}$ between the second end reflector 11 and the means for mode coupling 15. $LP'_{11}^{even}$ (or briefly $LP'_{11}$) identifies the state of the light field which oscillates in space mode $LP_{11}^{even}$ between the first end reflector 11 and the means for mode coupling 15 and oscillates in the space mode $LP_{01}$ between the second end reflector 11 and the means for mode coupling 15.

Figure 5C:
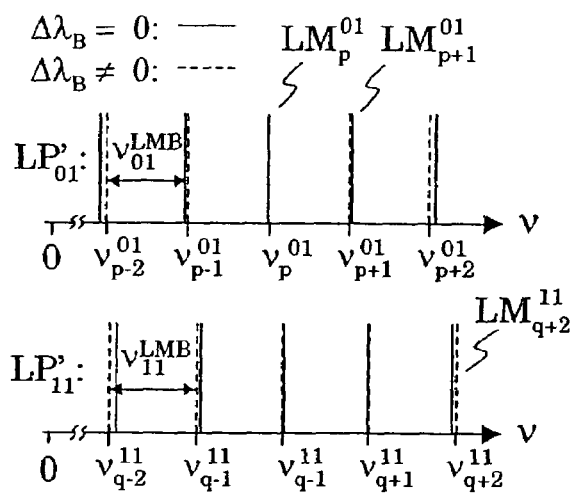
FIG. 5c shows a frequency spectrum of the longitudinal modes in $LP'_{01}$ and $LP'_{11}$ space modes for detuned and for undetuned end reflectors, diagrammatically.
Figure 5D:
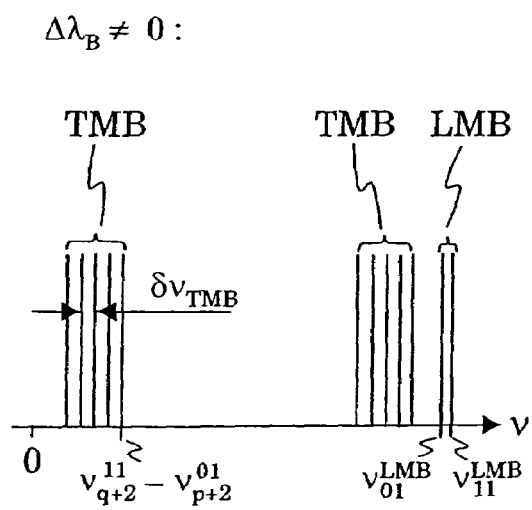
FIG. 5d shows a frequency spectrum of the beat signals of a sensor according to the invention with detuned end reflectors based on the spectrum of FIG. 5c, diagrammatically.

FIGS. 5c and 5d show the frequency spectra of the longitudinal modes and of the beat signals for $LP'_{01}$ and $LP'_{11}^{even}$ as orthogonal optical states quite analogously to FIGS. 5a and 5b. For the sake of clarity, abbreviated indices are used: "01" for $LP'_{01}$ and "11" for $LP'_{11}^{even}$. The beat signals between longitudinal modes $LM^{01}_p$ and $LM^{11}_q$ of different transversal space structure $LP'_{01}$ and $LP'_{11}^{even}$, detected in the sensor, are called transversal mode beats (TMB), analogously to the PMB signals detected in the sensor in the case of linear polarization.

Figure 6:
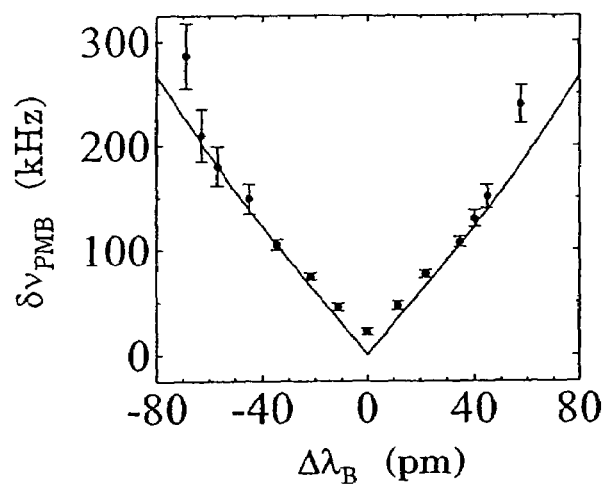
FIG. 6 shows the frequency spacing $\delta\nu_{PMB}$ of the PMB signals according to the invention of a given order, in dependence on the detuning of the end reflectors, measured and calculated.

In FIG. 6, the continuous line shows a calculated dependence on $\Delta \lambda_B$ of the frequency splitting $\delta v_{PMB}$. The points provided with error bars are experimentally determined values. Thus, a desired frequency separation $\delta v_{PMB}$ suitable for a measurement to be performed can be selected by suitable choice of mutual detuning of the FBGs 11, 12. The frequency separation $\delta v_{PMB}$ can be selected to be of such a magnitude that there is no overlapping of the various PMB signals of a given order and that the individual PMB signals can be unambiguously correlated. Naturally, the frequency resolution of the detection/evaluating unit 3 must be greater than the frequency separation $\delta v_{PMB}$.

Figure 7:
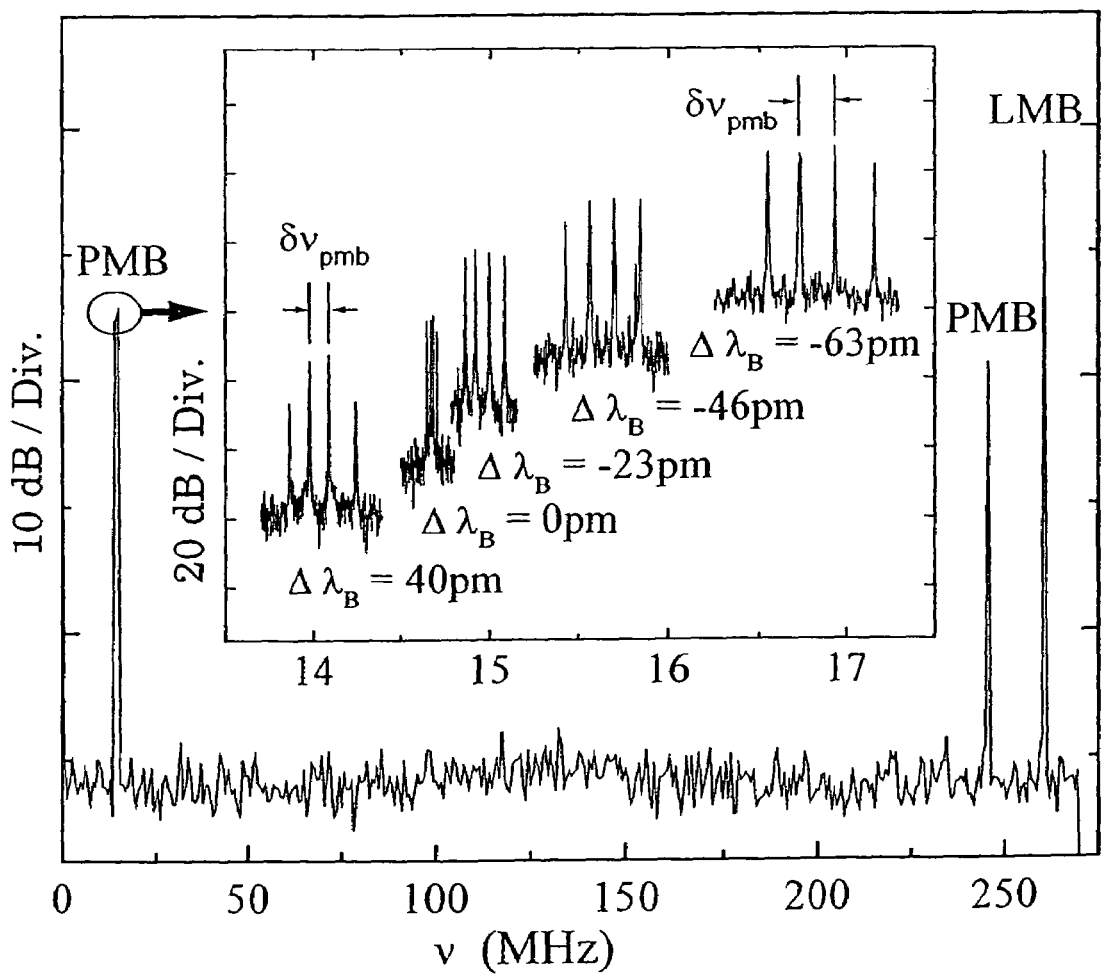
FIG. 7 shows a measured frequency spectrum of beat signals of a sensor with detailed section measurements of PMB signals for mutual detunings of different magnitude of the end reflectors.

FIG. 7 shows a frequency spectrum, measured by means of a sensor according to the invention operating with linear polarization, up to the first-order LMB signal which is at about 260 MHz. The two measured PMB signals can be seen at about 15 MHz and at about 245 MHz The spectrum can be compared well with the diagrammatic representation of FIG. 5b where, however, five longitudinal modes oscillate per linear polarization mode x, y in FIG. 5b instead of four in FIG. 7. In the detailed spectrum in the band around 15 MHz, measured with a higher frequency resolution, the cancellation of the degeneracy of the individual PMB signals due to the mutual detuning of the FBGs 11, 12 can be clearly seen. The PMB signal close to 15 MHz was measured and shown for five different values of $\Delta \lambda_B$ between 40 pm and −63 pm. The separation $\delta v_{PMB}$ between adjacent PMB signals of a given order clearly changes with $\Delta v_B$ as already shown in FIG. 6. The non-perfect vanishing of $\delta v_{PMB}$ at $\Delta \lambda_B=0$ is predominantly attributable to the fact that the experimental structure was highly asymmetric: $L_1=5$ cm and $L_2=35$ cm.

The Bragg wavelength $\lambda_B$ of an FBG changes with temperature. To set the various detunings $\Delta \lambda_B$, two mutually independent tubular furnaces were therefore used which in each case surrounded one of the two FBGs 11, 12. It was possible to individually select and maintain the temperature of each of the two FBGs 11, 12 by means of these tubular furnaces used as a detuning means.

To measure the quantity to be measured M, the sensor fiber 14 is exposed to the influence of this quantity to be measured M, for example a hydrostatic pressure in an oil well hole. In FIG. 1, this is represented by the thick arrows at M. Due to the interaction of the quantity to be measured M with the sensor fiber 14, the birefringence changes for the two polarizations x, y; s, f in the sensor fiber 14. The sensor is advantageously set in such a manner that it has vanishing overall birefringence when the measured variable M (M=0) vanishes. This means that the PMB signals coincide approximately with the LMB signals at M=0. Due to the mutual detuning of the FBGs, one of several separate PMB signals can then be detected close to 0 Hz instead of a wide PMB signal consisting of a number of virtually degenerated PMB signals of the same order by means of the detection/evaluating unit 3. For redundancy reasons, a number of the separate PMB signals can also be advantageously detected and evaluated for further improving the resolution. If then the birefringence of the sensor fiber 14 is changed by the pressure to be measured, the detected individual PMB signal will increase its frequency proportional to the pressure change. Since there is another PMB signal, as can also be seen from FIGS. 5b and 5d, which analogously reduces its frequency approximately proportionally to the pressure change from about $v_x^{LMB}$ or $v_y^{LMB}$ at M=0, these two PMB signals will coincide as the pressure increases further, namely at about $v_x^{LMB}/2$ or $v_y^{LMB}/2$. This results in a maximum pressure which can be unambiguously measured by means of the sensor.

Compared with sensors with known Fabry-Perot lasers, the resolution of a sensor according to the invention is considerably improved. The resolution which can be achieved in accordance with the invention is comparable to the resolution of sensors with DFB lasers which have only one longitudinal mode for each of the two orthogonal optical states.

It is also advantageous in the high resolution or the narrow signal to be detected that a more cost effective detection/evaluating unit 3 can be used for achieving the same resolution of a sensor known from the prior art.

A further advantage of a sensor according to the invention, particularly compared with sensors with DFB lasers, can be seen in the fact that for achieving the same laser amplification, only a lower amount of doping of the laser-amplifying fiber 13 is necessary because the length of the laser-amplifying fiber 13 can be selected to be long. In particular, cluster effects which can occur with high amounts of doping can be avoided by this means. A cavity length and sensor fiber length which can be selected to be large is also advantageous if the exact location of the occurrence of the quantity to be measured M is not predictable.

Typical dimensions and orders of magnitude for an exemplary embodiment of a sensor according to the invention are, for example:

pumping wavelength: 980 nm
pumping power: 50 mW according to a multiple of the laser threshold
90° splice set to ±5° or better ±2°
$Er^{3+}$ concentration of the laser-amplifying fiber 13: 5000 ppm (weight)
length of the major axes of the core of the laser fiber: 3 μm and 15 μm
difference in the indices of refraction of core and cladding of the laser fiber: 0.011
length of the laser fiber: 40 cm
birefringence of the laser fiber and of the FBGs 11, 12: $5.7 \times 10^{-5}$
temperature sensitivity of the laser fiber: 119 mrad/° C./m
pressure sensitivity of the pressure sensor when 20 cm of the sensor fiber 14 are exposed to the pressure: 2.15 Hz/Pa
pressure sensitivity of the laser fiber: 130 mrad/MPa/m
maximum unambiguously measurable pressure: 60 MPa
line width of an individual detected PMB signal: <1 kHz
frequency separation $\delta v_{PMB}$ of adjacent individual PMB signals: 130 kHz at $\Delta \lambda_B = 40$ pm and 210 kHz at $\Delta \lambda_B = -63$ pm
Bragg wavelength of the FBGs 11, 12: $\lambda_B \approx 1535$ nm
difference between the Bragg wavelengths of the FBGs 11, 12 for s and f polarization: $\Delta \lambda_{biref} = 60$ pm
resolution achieved: $4 \times 10^{-6}$ FSR corresponding to 465 Pa, corresponding to $7.7 \times 10^{-6}$ of the maximum unambiguously measurable pressure The alternative or additional features listed further above and in the text which follows are optional and can be combined in any manner with one another and with the exemplary embodiments represented in the description.

Instead of a fiber laser 1, another laser type can also be used. Instead of a sensor fiber 14 with elliptical core cross section, other, preferably polarization-maintaining fibers such as, for example, "panda" fibers, "bow tie" fibers can also be used. The sensor fiber 14 can also have a round core and a non-rotationally symmetric cross section of the fiber cladding, for example "side-hole" fibers, D-shaped fibers. To convert isotropic forces into anisotropic forces which then cause a change in the birefringence in the sensor fiber 14 on interaction with the quantity to be measured M, transducers can also be used. The sensor fiber 14 can interact wholly or partially with the quantity to be measured M. The sensor fiber 14 can differ from the laser-amplifying fiber 13, can be a part of the laser-amplifying fiber 13 or can be identical with the laser-amplifying fiber 13.

As the laser-amplifying fiber 13, a fiber with a non-rotationally symmetric core or also a fiber with a round core cross section can be used. Instead of $Er^{3+}$ doping, an $Nd^+$ doping or another means for laser amplification can also be used.

Apart from the sensor fiber 14 and the laser-amplifying fiber 13, the fiber laser 1 can also contain other fiber segments, particularly one or more intermediate fiber sections arranged preferably between the sensor fiber 14 and the laser-amplifying fiber 13. An arrangement and the embodiment of the fibers 13, 14 as provided in the exemplary embodiment described in conjunction with FIG. 1 is particularly advantageous.

If the sensor is operated with orthogonal polarization states x, y, these preferably have the same transversal space structure, preferably $LP_{01}$. The sensor can also be operated with orthogonal transversal space modes, for example with $LP_{01}$ and $LP_{11}^{even}$ instead of with orthogonal modes of the linear polarization. This has already been discussed in conjunction with FIGS. 5c and 5d. Preferably, two orthogonal space modes having the same linear polarization x or y are selected. Due to the above detailed discussion of the exemplary embodiment operating with linear polarization, the expert will clearly know what provisions he has to make for implementing a sensor operating with transversal space modes. In particular, fibers with elliptical core cross section are preferably used for the laser fibers and a fiber splice 15 offset laterally is then advantageously used as the means for mode coupling 15. Preferred end reflectors 11, 12 are fiber Bragg gratings also in this case. The quantity to be measured M, by interacting with the sensor fiber 14, creates a change in the birefringence for the two optical states which are orthogonal to one another due to their transversal space structure. In a sensor according to the invention, optical states can also be used which are orthogonal to one another due to their polarization state and due to their transversal spatial structure. For example $LP^x_{01}$ and $LP^y_{11}{}^{even}$ or $LP^x_{11}{}^{even}$ and $LP^y_{11}{}^{odd}$. A 90° splice which is laterally offset is then used as means for mode coupling.

The light in the fiber laser 1 advantageously oscillates in exactly two mutually orthogonal optical states, that is to say there are only exactly two standing wave fields in the fiber laser 1. However, it is also possible that the light can oscillate in more than two orthogonal optical states in the fiber laser 1, for example $LP_{01}$, $LP_{11}{}^{even}$ and $LP_{11}{}^{odd}$.

The FBGs 11, 12 are preferably incorporated in birefringent fibers, for example in fibers with an elliptical core, "bow tie" fibers or "panda" fibers. However, it is also possible to use for this purpose fibers which are not intrinsically birefringent, a birefringence of the FBGs then preferably being generated by the grating-inscribing process or by an additional device. The additional device is then used for generating a permanent mechanical stress in the FBG. The fiber segments into which the FBGs 11, 12 can be incorporated are the laser-amplifying fiber 13, the sensor fiber 14 or other, preferably undoped fiber segments of the laser fiber (intermediate fiber sections) which are spliced onto the laser-amplifying fiber 13, the sensor fiber 14 or onto another intermediate fiber section. The FBGs 11, 12 are advantageously holographically inscribed into the laser fiber. However, they can also be produced by other means, for example by etching or by a mechanical method. It is very advantageous if both FBGs 11, 12 are birefringent, but it is adequate if one of the end reflectors 11, 12 is birefringent. The birefringence of the end reflectors 11, 12 can also be called mode-selective reflectivity of the end reflectors 11, 12 because the reflectivity of a birefringent FBG depends on the optical state (polarization, transversal space structure). Instead of FBGs 11, 12, other types of wavelength-selective reflecting end reflectors 11, 12 can also be used, for example dielectric mirrors, mirrors with a color filter or also photonic crystals are conceivable. Two FBGs 11, 12 of different types of construction or a combination of one FBG with another type of end reflector can also be used.

Wavelength-selective reflectivity of the end reflectors 11, 12 here means that the reflection spectra of the end reflectors 11, 12 have one or more peaks (maxima) depending on the wavelength. Or: that one of the end reflectors 11, 12 does not have an (almost) constant reflectivity in the wavelength range in which the other end reflector 12, 11 has a high reflectivity or has a peak in the reflection spectrum. It is also possible to speak of a narrow-band spectral reflectivity of the end reflectors 11, 12. It is also possible to have a number of reflection peaks of the end reflectors at different wavelengths.

It is advantageous if one of the end reflectors 11, 12 is detuned by less than the sum of the widths of the reflection peaks of the two end reflectors 11, 12 and, in particular, by less than one half and preferably less than one quarter of the sum of the widths of the reflection peaks of the two end reflectors 11, 12 with respect to the other end reflector 12, 11. The FWHM of a reflection peak is taken as a measure of its width. In the case of a birefringent end reflector 11, 12, this is the FWHM of the reflection peak for one of the polarizations x, y. If the width of the reflection peaks is greater for one polarization x, y, than the width for the other polarization y, x, the mean value of these widths can be taken.

Mutual detuning of the end reflectors 11, 12 means that the mean value of the central wavelengths of the reflection peaks of the first end reflector 11 for the two orthogonal optical states x, y; $LP_{01}$, $LP_{11}^{even}$ differs from the mean value of the central wavelengths of the reflection peaks of the second end reflector 12 for the two orthogonal optical states x, y; $LP_{01}$, $LP_{11}^{even}$. If one of the end reflectors 11, 12 is not birefringent, the mean value must be replaced by the central wavelength of one reflection peak. In the case of birefringent fiber Bragg gratings 11, 12, the following applies:

$$\Delta\lambda_B = (\lambda_{B,f}^{FBG1} + \lambda_{B,s}^{FBG1})/2 - (\lambda_{B,f}^{FBG2} + \lambda_{B,s}^{FBG2})/2.$$

For non-birefringent FBGs 11, 12, $\lambda_B = \lambda_{B,f} = \lambda_{B,s}$. Naturally, in the case where at least one of the end reflectors 11, 12 has a number of reflection peaks, such a reflection peak which contains at least one of the wavelengths at which the fiber laser 1 is oscillating is always meant. Due to the fact that light can propagate in two mutually orthogonal optical states in the fiber laser 1, there is automatically an upper limit for the mutual detuning of the end reflectors 11, 12. See also FIG. 3c in this respect: above too great a mutual detuning, the reflection peaks for x polarization will overlap by only such a small amount that the losses are so great that the fiber laser 1 no longer oscillates with x-polarized light.

The value $\Delta\lambda_B$ of the detuning is advantageously selected during the production of the end reflectors 11, 12. It is also possible to make $\Delta\lambda_B$ variably adjustable by means of a detuning means. Apart from the abovementioned temperature, for example, an adjustable mechanical stress (tensile or compressive force) acting on at least one of the end reflectors 11, 12 can also be exerted by the detuning means for adjusting $\Delta\lambda_B$.

In practice, a sensor according to the invention can be used for measuring any physical quantity to be measured M. It only needs to be possible to produce a change in the birefringence in the sensor fiber 14 by means of a change in the quantity to be measured M. Examples of the quantity to be measured M are: pressures, particularly also hydrostatic pressures, mechanical stresses (acting axially or radially on the sensor fiber 14), temperatures, electromagnetic quantities, for example by using a piezoelectric, electrostrictive or magnetostrictive cladding for the sensor fiber 14.

The above features can be advantageous jointly or else individually or in any combination.

LIST OF REFERENCE DESIGNATIONS

1 Fiber laser
11 First end reflector; first FBG
12 Second end reflector; second FBG
13 Laser-amplifying fiber
14 Sensor fiber
15 Means for mode coupling; 90° splice; laterally-offset splice
2 Pumping light source; pumping laser
3 Detection/evaluating unit
4 Fiber coupler
5 Optical isolator
c Velocity of light in a vacuum
f Fast axis
FBG Fiber Bragg grating
FSR Free spectral range
FWHM Full width at half maximum
L Cavity length of the laser, $L=L_1+L_2$
$L_1$ Length of the laser fiber segment between the first end reflector and the means for mode coupling
$L_2$ Length of the laser fiber segment between the second end reflector and the means for mode coupling
$LM^x_p$ Longitudinal mode of order p in x polarization
$LM^y_q$ Longitudinal mode of order q in y polarization
$LM^{01}_p$ Longitudinal mode of order p in transversal space mode $LP_{01}$
$LM^{11}_q$ Longitudinal mode of order q in transversal space mode $LP_{11}^{even}$
LMB Longitudinal mode beat
$LP_{01}$ Zero-order transversal space mode (basic mode)
$LP_{11}^{even}$ First-order transversal space mode
M Quantity to be measured
n Effective index of refraction
p Integer; order of the longitudinal modes in x polarization
PMB Polarization mode beat
q Integer; order of the longitudinal modes in y polarization
R Reflectivity of a fiber Bragg grating
$R_x$ Reflectivity of a fiber Bragg grating for x polarization
$R_y$ Reflectivity of a fiber Bragg grating for y polarization
s Slow axis
T Transmission of a fiber Bragg grating (normalized); T=1−R
TMB Transversal space mode beat
x Coordinate axis; axis of a linear polarization
y Coordinate axis; axis of a linear polarization
z Coordinate axis; fiber axis
φ (Relative) phase shift at reflection
∂φ/∂ν Dispersion of the phase shift φ
λ Wavelength $\lambda_B$ Bragg wavelength; wavelength of a reflection peak of a fiber Bragg grating $\lambda_{B,s}$ Bragg wavelength for light with linear polarization parallel to the slow axis $\lambda_{B,f}$ Bragg wavelength for light with linear polarization parallel to the fast axis $\Delta\lambda_B$ Difference between the Bragg wavelengths of the two FBGs; mutual detuning of the end reflectors $\Delta\lambda_{biref}$ Wavelength difference between the reflection peaks (Bragg wavelengths) of an FBG for the two orthogonal optical states x, y $\nu$ Frequency $\nu_x^{LMB}$ Frequency separation between adjacent longitudinal modes in x polarization $\nu_y^{LMB}$ Frequency separation between adjacent longitudinal modes in y polarization $\nu_{p,q}^{x,y}$ Frequency of a longitudinal mode of order p, q in x, y polarization $\nu_{p,q}^{x,y}$ Frequency of a longitudinal mode of order p, q in transversal space mode $LP_{01}$, $LP_{11}^{even}$ $\delta\nu_{PMB}$ Frequency separation between individual PMB signals of a given order

The invention claimed is:

1. A fiber-optical sensor for measuring a quantity to be measured, comprising a pumping light source, a fiber laser and a detection and evaluation unit, wherein the fiber laser comprises
   (a) a birefringent first end reflector and a second end reflector,
   (b) a laser-amplifying fiber and a sensor fiber and
   (c) a means for mode coupling, wherein
   (d) the laser-amplifying fiber, the sensor fiber and the means for mode coupling are arranged between the first end reflector and the second end reflector, and wherein
   (e) in the fiber laser, light is capable of propagating in two optical states which are orthogonal to one another due to their polarization or their transversal space structure, wherein
   (f) the mutually orthogonal optical states can be coupled to one another by the means for mode coupling, and wherein
   (g) a number of longitudinal modes are capable of oscillating in each of the two orthogonal optical states in the fiber laser, and wherein
   (h) a change in the birefringence first end reflector can be achieved for the two orthogonal optical states in the sensor fiber by interaction of the quantity to be measured with the sensor fiber, characterized in that
   (i) the first end reflector is detuned with respect to the second end reflector.

2. The fiber-optical sensor as claimed in claim 1, wherein the end reflectors are constructed in such a manner that the dispersion $\partial\phi_1/\partial\nu$ of the phase shift $\phi$ on reflection at the first end reflector plus the dispersion $\partial\phi_2/\partial\nu$ of the phase shift $\phi$ on reflection at the second end reflector is greater for a first one of the two optical states than for the second one of the two optical states.

3. The fiber-optical sensor as claimed in claim 1, wherein, either
   (a) the two orthogonal optical states are two linear polarization modes which, in particular, have the same transversal space structure, particularly $LP_{01}$, and the means for mode coupling is a 90° fiber splice, or
   (b) the two orthogonal optical states are two transversal space modes, particularly $LP_{01}$ and $LP_{11}^{even}$ which, in particular, have the same linear polarization and the means for mode coupling is a fiber splice which is laterally offset.

4. The fiber-optical sensor as claimed in claim 1, wherein the fiber laser, light is capable of propagating in exactly two orthogonal optical states.

5. The fiber-optical sensor as claimed in claim 1, wherein the first end reflector is detuned with respect to the second end reflector by less than the sum of the widths of the reflection peaks of the two end reflectors and, in particular, is detuned with respect to the second end reflector by less than one half of the sum of the widths of the reflection peaks of the two end reflectors.

6. The fiber-optical sensor as claimed in claim 1, wherein
   (a) the second end reflector is birefringent and, in particular,
   (b) the two end reflectors are constructed as fiber Bragg gratings.

7. The fiber-optical sensor as claimed in claim 1, wherein
   (a) the laser-amplifying fiber is doped and has an elliptical core cross section,
   (b) the two end reflectors are constructed as fiber Bragg gratings inscribed in the laser-amplifying fiber, which are similarly constructed apart from the mutual detuning,
   (c) the means for mode coupling is arranged in the center of the optical path length between the two end reflectors,
   (d) the part of the laser-amplifying fiber arranged between one of the end reflectors and the means for mode coupling is identical with the sensor fiber.

8. The fiber-optical sensor as claimed in claim 1, whrein for selecting a suitable mutual detuning of the two end reflectors, at least one of the two end reflectors interacts with a detuning means and, in particular, that at least one of the two end reflectors can be exposed to a selectable mechanical tensile or compressive force or a selectable temperature by the detuning means.

9. The fiber-optical sensor as claimed in claim 1, wherein the quantity to be measured is a pressure, particularly a hydrostatic pressure, a temperature, a mechanical stress or an electromagnetic quantity, particularly an electrical quantity.

10. A method for measuring a quantity to be measured,
    (a) wherein a pumping light source optically pumps a fiber laser which has a birefringent first end reflector and a second end reflector,
    (b) so that in the fiber laser, a number of longitudinal modes oscillate in each of two optical states which are orthogonal to one another due to their polarization or their transversal space structure,
    (c) wherein the mutually orthogonal optical states are coupled to one another by a means for mode coupling, and
    (d) wherein the quantity to be measured interacts with a sensor fiber of the fiber laser in such a manner that a change in the birefringence first end reflector for the two orthogonal optical states is generated in the sensor fiber,
    wherein
    (e) two end reflectors which are detuned with respect to one another are used as end reflectors, and
    (f) at least one signal is detected and evaluated which is produced by the interference between exactly two longitudinal modes which are orthogonal to one another due to their polarization or their transversal space structure.

* * * * *